Dec. 2, 1958
J. D'A. CLARK ET AL
2,862,291
APPARATUS AND METHOD FOR SEPARATING PRESSED
BOARD FROM CAUL PLATES
Filed Oct. 30, 1953
2 Sheets-Sheet 1
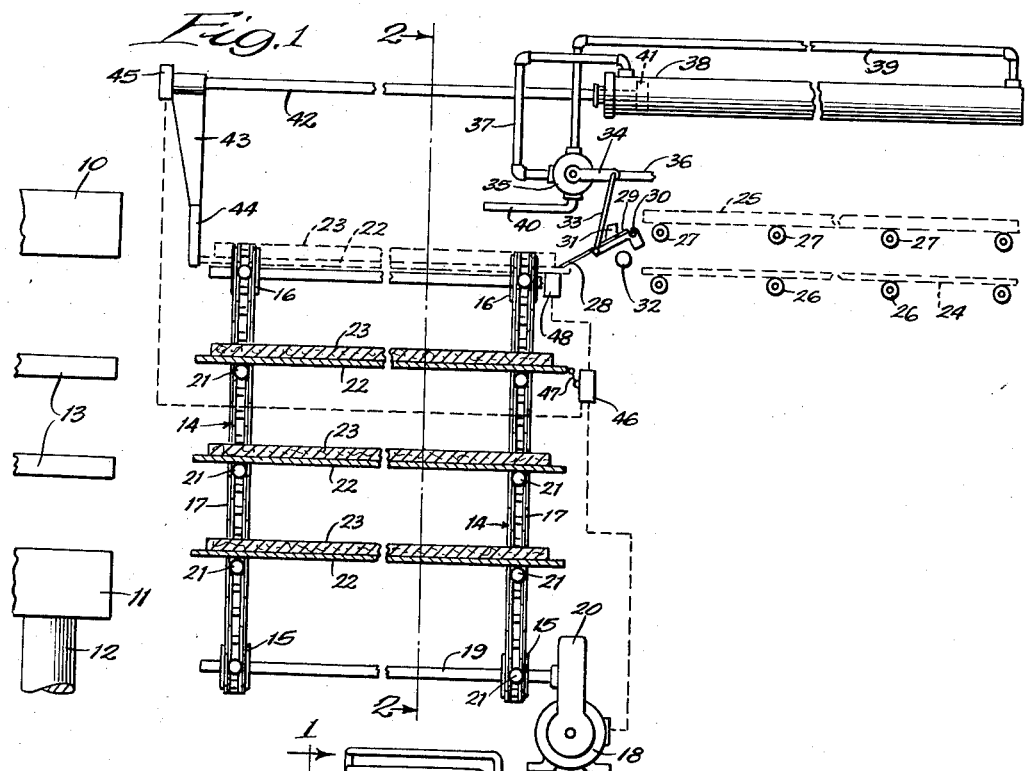
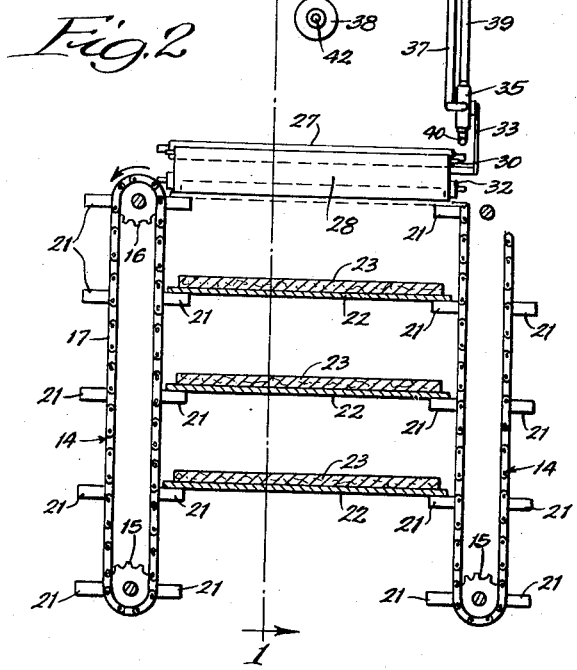
INVENTORS:
James d'A. Clark and
BY Robert D. Lambert
Dawson, Tilton & Graham
ATTORNEYS.

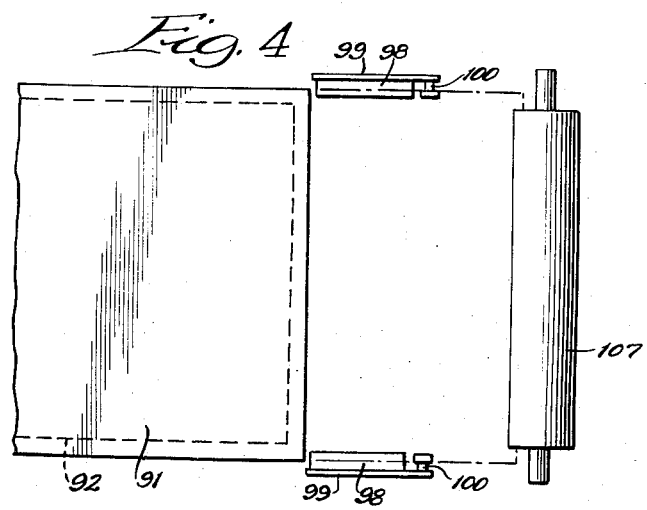
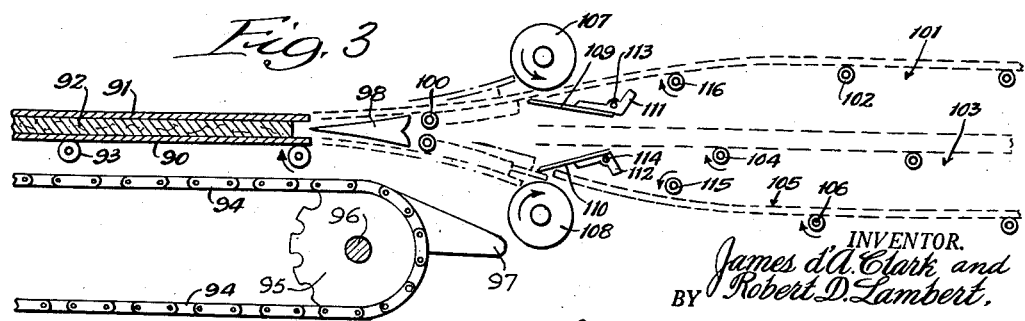

United States Patent Office 2,862,291
Patented Dec. 2, 1958

2,862,291

APPARATUS AND METHOD FOR SEPARATING PRESSED BOARD FROM CAUL PLATES

James d'A. Clark, Longview, Wash., and Robert D. Lambert, Sandpoint, Idaho, assignors to Changewood Corporation, Chicago, Ill., a corporation of Illinois Application October 30, 1953, Serial No. 389,294

5 Claims. (Cl. 29—239)

This invention relates to the manufacture of fibrous boards and, more particularly, to a method and apparatus for the separation of the boards from their adjacent caul plates after consolidation thereon in a molding press by the application of heat and pressure.

In the manufacture of fibrous boards, the material from which the boards are formed, such as wood chips and shavings, etc., is suitably processed and the treated raw material is consolidated into boards in a molding press operation wherein both heat and pressure are applied to the material. One of the problems of handling batches of hot boards and hot metal caul plates upon their issuance from a molding press is that despite the application of parting agents to the adjacent faces of the plates, invariably there is sufficient intermittent sticking of the consolidated boards to the caul plates, particularly along the edges of the board, to make the operation of parting the boards from the plates and their dispatch on their respective conveyors a matter requiring the continuous attention of at least one operator. At the present, the duty of this operator is to separate the hot board from the hot metal caul plates manually and thereafter direct each onto its own conveyor line for further processing. The board most generally passes through trim saws and the metal caul plates are cleaned, their surface treated, and thereafter they are repositioned to consolidate the matrix of a succeeding board.

The importance of insuring the separation of the board from the caul plates without fail, will be appreciated when it is realized that the production of an entire plant would be stopped temporarily if the combined board and metal caul plates went through the board line to the trim saws or, alternatively, if the combination went through the caul line to the caul cleaning means. In the latter case, the caul cleaning apparatus would be fouled up in the attempt to clean off an entire board from the face of the cauls.

Since both the board and caul plates are very hot (they issue from the molding press at a temperature usually well over 300° F.), manual separation is unpleasant and also arduous, especially if the board is large. It is not now uncommon to have boards ranging to a size of four feet by sixteen feet.

Because the means for defining the position of the ends of the boards on the caul plates give rather uncertain results (unless accomplished by some special means such as are disclosed in our co-pending application Serial No. 394,022, filed November 24, 1953), together with the effect of a somewhat uncertain spreading of the matrix by the pressing operation, the location and nature of the leading end of the pressed board is such as to make it difficult to grasp upon issuance with automatic mechanical means. Some attempts have been made to separate the leading edge of the board from the caul plate or plates by suction lifting devices. These devices have not been sufficiently reliable to dismiss the need for having an operator in constant attendance along with auxiliary manual equipment.

It is accordingly an object of this invention to provide a reliable method and apparatus for separating molded fibrous board from its adjacent caul plate after issuance thereof from the molding press. Another object is to provide simple, automatic apparatus for dispatching the boards and caul plates to their respective lines for further processing after the separation of the plates and boards. Still another object is in the provision of automatic apparatus for separating pressed board from a single caul plate or from a pair of caul plates that sandwich the board therebetween. A further object is in providing apparatus and a method wherein a blade is forced between the board and caul plate to effect a separation thereof. Still a further object is to provide wedge means to split a sandwich made up of a pressed board together with the caul plates on each side thereof, and after the initial separation of the board from one of the plates, to provide apparatus for separating the pressed board from the other caul plate that it may, but not necessarily does, remain stuck to. Yet a further object is in providing apparatus wherein in the event a pressed board adheres tenaciously to a caul plate and difficulty is experienced in separating the two by a separator blade, the board and plates are flexed, putting both under large shearing stresses that that are effective with the blade to achieve a separation of the board and plates. Additional objects and advantages will appear as the specification proceeds.

Embodiments of the invention are illustrated in the accompanying drawings, in which—

Fig. 1 is a transverse sectional view largely diagrammatic, showing separator apparatus embodying our invention and which is taken on the line 1—1 of Fig. 2; Fig. 2 is a sectional view taken on the line 2—2 of Fig. 1; Fig. 3 is a broken side view in elevation with parts thereof shown in section of a further modified form of the invention; and Fig. 4 is a top plan view of the apparatus illustrated in Fig. 3.

The apparatus illustrated in Fig. 1 includes a portion of the molding press which has an upper platen 10, a lower platen 11 that is operatively arranged with the shaft 12 of a pressure piston, and intermediate platens 13. This apparatus forms no part of the present invention and is illustrated for the purpose of making the explanation more readily understood. In the forming of pressed board, the lower platen 11 is pushed upwardly toward the upper stationary platen 10 and the fibrous board and the caul plates adjacent thereto are squeezed between the intermediate platens 13. After the application of sufficient heat and pressure to consolidate the board, the caul plates and pressed board are removed from the platens and are transferred to the apparatus shown in the right of the platens in Fig. 1, as for example by means disclosed in my copending application Serial No. 411,937, filed February 3, 1954, and which apparatus will now be described.

The apparatus upon which the caul plates and pressed board are deposited consists of an endless conveyor chain 14 entrained about a lower drive sprocket 15 and an upper idler sprocket 16. The endless chain 14 has the usual links 17 which are pivotally connected together to provide a flexible chain. There are at least two sets of endless chains 14 entrained about their sprockets and two of these are driven, as is illustrated in Fig. 1, by a motor 18 which is operatively arranged with a drive shaft 19 through a gear reducer 20. The chains 14 and sprockets 5 are all identical and a separate description applied to each is therefore believed unnecessary. The remaining pair of endless chains may also have a pair of sprockets 15 driven by the motor 18 through the same or a separate gear reducer 20 and a drive shaft similar to the shaft 19.

Rigidly secured to the links 17 at equally spaced intervals about the chains 14 are rollers 21 that are adapted to receive thereon the caul plates 22 and pressed boards 23. Preferably, the boards and caul plates are fed onto the rollers 21 adjacent the lower end of the chains 14 and are thereafter lifted upwardly as the chains travel about the sprockets. Preferably, the motor 18 is driven intermittently and the controls therefor will be described subsequently. The caul plates are relatively thin and are flexible and may be formed of metal, such as aluminum sheets having a thickness of from 1/8 to 1/4 of an inch, or of steel having a lesser thickness.

Adjacent the upper ends of the chains 14 are provided a caul line conveyor 24 and a pressed board conveyor 25. Any suitable conveyors 24 and 25 that are operative to move the separated board and caul plate may be readily used, and as an example, in the illustration given each of the conveyors comprise the rollers 26 and 27, which may be driven rollers, and therefore positively advance the plates and boards.

It is seen that apparatus is provided between the elevating mechanism and the caul and board conveyors for separting the pressed board from the caul plates. This apparatus preferably includes a separator blade or a doctor blade 28 that is metal and preferably is slightly flexible, and which is rigidly secured to an angle iron 29 pivotally mounted on an axis 30 to a supporting frame or side walls of the apparatus. A stop 31 is provided above the angle iron 29 to limit the upward movement thereof. Just below the angle member 29 an idler roller 32 is provided to guide the caul plates onto the caul line 24.

The angle member 29 is connected by a rigid link 33 to a movable handle 34 of a 4-way valve 35. In the position shown in Fig. 1, the valve 35 is in one operating position wherein flow communication is provided between a conduit 36 that communicates at its opposite end with a source of pressure fluid, and the conduit 37 which leads through a suitable inlet port to the forward end of a cylinder 38. At the same time, when the valve is in the position shown, the rear end of the cylinder 38 is in open communication through a conduit 39 leading to the valve and a conduit 40 leading from the valve to the pressure fluid return line. On the other hand, when the operating handle or lever 34 is swung downwardly, communication is provided through the conduit 39 between the rear end portion of the cylinder 38 and the source of pressure fluid through the conduit 36. The forward end of the cylinder 38 is at such time in communication through conduit 37 and conduit 40 with the return supply or reservoir for the pressure fluid.

Slidably mounted within the cylinder 38 is a piston 41 having secured thereto an elongated piston rod 42 rigidly secured at its opposite end to a pusher member 43 having an end portion 44 adapted to engage a caul plate 22 positioned at the upper end of the lifting chains 14.

The circuit for the motor 18 includes a normally opened switch 45 having in series therewith a normally open lock-in switch 46, both of the switches 45 and 46 being in series with the motor-actuating circuit. When the member 43 is moved into the position shown in Fig. 1, the switch 45 is closed as is the switch 46 when a caul plate is in engagement with the trip lever 47 thereof. When both switches are closed the motor 18 is energized and the endless chain 14 will be driven so that the chain will be advanced one position and a caul plate and board will thereby be raised to a position adjacent the unlocking switch 48. An advancing caul plate is adapted to trip the switch 48 and thereby unlock or break the motor energizing circuit to interrupt the advance of the endless chains 14.

In operation of this apparatus, a consolidated board 23 and caul plate 22 is advanced into the uppermost position between endless chains 14. As a caul plate is advanced from a position adjacent switch 46 to the uppermost position adjacent the switch 48, the end of the doctor blade 28 will be engaged by the end of the caul plate. It should be noted that the caul plate extends outwardly beyond the end of the board 23 and it should be further noted that the weight of the doctor blade 28 and angle member 29 is sufficient to cause it to drop downwardly to swing the control lever 34 of the valve 35 to a substantially vertical position rather than the horizontal position illustrated in Fig. 1. Therefore, as the caul plate rises it engages the end of the doctor blade and pivots it upwardly about the pivotal axis 30 of the angle member 29.

As the blade 28 and angle member 29 are pivoted upwardly, the rigid linkage 33 secured to the angle member at one end and to the valve lever 34 at its other end moves the valve into the position illustrated and pressure fluid flows through the conduit 36, through the conduit 37, and into the forward end of cylinder 38 where it is operative to drive the piston 41 rearwardly into the cylinder 38. This movement of the piston 41 and piston rod 42 secured thereto causes the pusher member 44 to engage the uppermost caul plate and board and to force them toward the right or toward the conveyors 24 and 25. This movement of the caul plate and board will tend to drive the end of the doctor blade in between the board and plate and to thereby effectuate a separation thereof. After being separated the caul plate 22 will move below the roller 32 and onto the conveyor rollers 26. The separated board 23 will move over the doctor blade 28 and will drop onto the upper conveyor rollers 27.

As soon as the separated caul plate which has moved onto the lower conveyor rollers 26 has moved clear of the doctor blade 28, the blade will fall downwardly pulling with it the valve lever 34. This movement will reverse the position of the 4-way valve 35 and pressure fluid will immediately be admitted through the conduit 36 and conduit 39 to the rear end of the cylinder 38. The pressure within the forward end of the cylinder will be relieved through conduit 37 and conduit 40 and piston 41 will be driven left and to the forward end of the cylinder. Piston rod 42 and pusher member 43 will then trip the switch 45 which will complete the motor energizing circuit (assuming that a caul plate is in position to close the switch 46), and the endless chains will be driven to raise another caul plate and board to the uppermost position adjacent the unlocking switch 48. The operation will then again be repeated.

In the modification shown in Figs. 3 and 4, a caul plate and board sandwich is also provided and the apparatus is effective to separate the plates from the board. Here the caul plates 90 and 91 are slightly wider than the board 92, as is seen best in Fig. 4. The sandwich is supported upon a conveyor that may be formed by a plurality of spaced idler rollers 93. An endless chain 94 is provided and it is entrained at one end about a sprocket 95 that is driven by a suitable motor, not shown, in geared arrangement with the shaft 96. Pusher members 97 are secured to the endless chain 94 and as the chain is rotated about the sprockets the pusher members engage the caul plate and board sandwiches and advance them toward the spaced-apart splitting wedges 98. As is seen best in Fig. 4, a wedge is provided on each side of the caul plates and is adapted to be received therebetween. The forward ends of the wedges are reduced in dimension and enlarge rearwardly so that as the wedges are forced between the caul plates they are operative to effect at least a separation of one caul plate from the board 92.

It is conceivable that the wedges 98 may be operative to separate both the upper and lower caul plates 90 and 91 from the board 92, but more probably only one of the plates will be separated from the board. The remaining plate will stick to the board.

The wedges or plow members 98 are secured to rigid support members 99, as is seen in Fig. 4, by any suitable means. The support members 99 provide a rotatable mounting for the rollers 100 that guide the caul plates in their movement, as is seen by dotted lines in Fig. 3.

Three conveyors are provided: an upper caul plate conveyor 101 formed by a plurality of rollers 102, an intermediate pressed board conveyor 103 formed by the rollers 104, and a lower caul plate conveyor 105 formed by rollers 106. Preferably all of the rollers are driven. Guide rollers 107 and 108 are also provided in spaced relation and these members are driven by a suitable motor and are operative to guide the caul plates onto their respective conveyors.

Doctor blades 109 and 110 are rigidly secured respectively to the angle supports 111 and 112 that are each pivotally mounted through axes 113 and 114.

In operation of the embodiment shown in Figs. 3 and 4, the members 97 are advanced by the endless conveyor 94 and positively advance the caul plates and board sandwich toward the wedges 98. As the caul plates and board are advanced, the wedges 98 pry apart the caul plates and the board 92 may, or may not, adhere to one of the plates. If, for example, the board 92 should adhere to the caul plate 91, that is to say, the lower caul plate 90 is broken free from the board by the wedges 98, the lower caul plate is advanced over the positively driven roller 108 and the lower doctor blade 110 slides over the top surface of plate 90. The lower plate 90 advances under the guide roller 115 and onto the conveyor rollers 106.

At the same time, the upper caul plate 91 with the board 92 adhering thereto advances as is indicated by the dotted lines and is moved below the positively driven roller 107 and the doctor blade 109 engages the caul plate and pressed board along the line of adherence therebetween. Member 97 continues to drive the upper caul plate and board forwardly and the doctor blade 109 is effective to cause a separation of the board and caul plate. Upper caul plate 91 then advances over the guide roller 116 and onto the positively driven rollers 102 of the upper conveyor. The separated board 92 drops below the upper doctor blade 109 and between the upper and lower doctor blades and onto the rollers 104 of the middle conveyor 103. The separated caul plates and pressed board are then carried through their individual lines where the caul plates are cleaned and further treated and the pressed board may be trimmed, etc. If the board sticks to the lower caul plate, or if both plates are broken free and the board is thereby freely supported upon the lower caul, the lower doctor blade 110 is operative to separate the lower caul and board.

In each embodiment of the invention illustrated and that has been described, the caul plate or caul plates with the board adhering thereto is positively advanced toward doctor blades that engage the caul plate and board along the line of adherence therebetween. The continued positive advance of the plate and board cause the doctor blades to effectuate a separation therebetween. In the event that the pressed board should cling or should adhere to a caul plate more tenaciously than is usual, the doctor blade tending to retard movement of the caul plate and board in one direction while the positive driving member tends to advance it toward the blade, will be operative to cause a bending or flexing of the plate and board that will impose shearing forces thereon of considerable magnitude. These shearing forces in combination with the prying or driving operation of the doctor blade will be effective to separate the board and plate. Thus, even though a plate and board may be stuck together very firmly, the apparatus is nevertheless operative to effect a separation therebetween and to thereafter deliver a separated board and plate to their respective treating lines. The attention of an operator is therefore unneeded and the simplicity and effectiveness of the apparatus enables its operation for long periods without attention.

In the specification the invention has been described primarily in terms of the apparatus, but it is believed clear that the invention encompasses both the apparatus and the method of separating a pressed board from a caul plate wherein the plate and board are advanced against a doctor blade that engages the plate and board along the line of adhesion therebetween at an acute angle, and thereafter continuing to advance the plate and board until the forward movement thereof against the doctor blade causes a separation of the board and plate.

While in the foregoing specification embodiments of the invention have been set out in considerable detail for purposes of illustration, it will be apparent to those skilled in the art that considerable variation in these details may be made without departing from the spirit and principles of the invention.

We claim:

1. In apparatus for separating a pair of flexible caul plates from a fibrous board interposed therebetween and adhering thereto, said plates projecting over both the sides and the forward end of the board means for supporting said caul plates and board, a pair of spaced-apart wedges adapted to be interposed between said caul plates along the projecting longitudinal edges thereof, power means for positively advancing said caul plates and board toward said wedges whereby said wedges, when forced between said plates, are operative to pry the forward position of at least one of said caul plates from said board, a doctor blade positioned across the forward end of each caul plate and adapted to engage the edge of the board adjacent the surface of the plate guide means for guiding one of said caul plates in its path of advance toward one of said doctor blades while guiding the other of said caul plates toward the other doctor blade, and conveyor means for receiving said caul plates and board after the same are separated.

2. In apparatus for separating a pair of flexible caul plates from a fibrous board compressed therebetween and adhering thereto, said plate projecting over both sides and over the forward end portion of said board conveyor means for supporting said caul plates and board, a pair of wedges supported in spaced-apart relation in general alignment with the longitudinal projecting edge portions of said caul plates and adapted to be interposed therebetween to pry at least one of said caul plates from said board, power means adapted to engage said caul plates for advancing the same along said conveyor means and toward said wedges, a pair of doctor blades, one of said blades being adapted to engage the forward end surface of a caul plate along the line of adhesion of the board thereto as the plate and board are advanced beyond said wedges and the other of said doctor blades being adapted to engage the forward end surface of the other of said caul plates and the line of adhesion of the board thereto as they advance beyond said wedges, said power means being operative to force said plates and board into engagement with said doctor blades, and separate conveyor means for carrying the separated caul plates and board after separation thereof beyond said doctor blades.

3. In apparatus for separating a fibrous board from a pair of flexible caul plates extending slightly beyond the board and adhering to the opposite faces thereof, wedge means adapted to be interposed between said caul plates along the longitudinal edges thereof, a pair of doctor blades positioned across the extended plates, one of said doctor blades being adapted to engage a caul plate and board along one line of adhesion therebetween and the other of said doctor blades being adapted to engage the other of said caul plates and the board along the other line of adhesion therebetween, conveyor means adapted to receive said caul plates and board at one position and to advance the same with said caul plates about said wedge means to a subsequent position with one end thereof adjacent said doctor blades, power means engageable with the other end of said plates and being adapted to positively advance said caul plates and board toward said doctor blades for engagement therewith and having sufficient power to flex the plates and board along their longitudinal axes if they do not immediately advance along the faces of the blades, and conveyor means adapted to carry the separated caul plates and board to positions beyond said doctor blades after the separation of the board and plates.

4. The structure claim 3, wherein said means for positively advancing said caul plates and board is a pusher member carried by an endless chain and adapted to be moved into pushing engagement with said caul plates.

5. In apparatus for separating a pair of flexible caul plates from a fibrous board interposed therebetween and adhering thereto, said plates projecting over both the sides and the forward end of the board, means for supporting said caul plates and board, wedge means adapted to be interposed between said caul plates along the projecting longitudinal edges thereof, power means for advancing said caul plates and board past said wedge means whereby said wedge means are operative to pry at least the forward portion of one of said caul plates from said board, doctor blade means positioned across the forward end of each caul plate and adapted to engage the forward end of each caul plate and adapted to engage the edge of the board adjacent the surface of the plate, said power means applying a positive and continuous force against said caul plates during the engagement thereof with said doctor blade means, and conveyor means for receiving said caul plates and board after the same are separated.

References Cited in the file of this patent

UNITED STATES PATENTS

| | | |
|---|---|---|
| 612,375 | Bennett | Oct. 11, 1898 |
| 757,667 | Mayall | Apr. 19, 1904 |
| 1,279,563 | Lowell | Sept. 24, 1918 |
| 1,472,833 | Herold | Nov. 6, 1923 |
| 1,492,011 | Ayling | Apr. 29, 1924 |
| 1,597,875 | Ferrier | Aug. 31, 1926 |
| 1,883,662 | Fisher | Oct. 18, 1932 |
| 2,127,278 | Welch | Aug. 16, 1938 |
| 2,627,883 | Littley | Feb. 10, 1953 |